United States Patent
López-Chicheri et al.

(10) Patent No.: US 9,754,105 B1
(45) Date of Patent: Sep. 5, 2017

(54) PREVENTING THE SUCCESSFUL EXPLOITATION OF SOFTWARE APPLICATION VULNERABILITY FOR MALICIOUS PURPOSES

(71) Applicant: Malwarebytes Corporation, San Jose, CA (US)

(72) Inventors: Pedro Bustamante López-Chicheri, Manila (PH); David Sánchez Lavado, Bilbao (ES)

(73) Assignee: Malwarebytes Corporation, Santa Clara, CA (US)

( * ) Notice: Subject to any disclaimer, the term of this patent is extended or adjusted under 35 U.S.C. 154(b) by 386 days.

(21) Appl. No.: 14/035,678

(22) Filed: Sep. 24, 2013

Related U.S. Application Data

(60) Provisional application No. 61/705,374, filed on Sep. 25, 2012.

(51) Int. Cl.
  *G06F 21/55* (2013.01)
  *G06F 21/56* (2013.01)

(52) U.S. Cl.
  CPC ............ G06F 21/55 (2013.01); G06F 21/552 (2013.01); G06F 21/554 (2013.01); G06F 21/566 (2013.01)

(58) Field of Classification Search
  CPC ........ G06F 21/55; G06F 21/53; G06F 21/566; G06F 21/556; G06F 21/554; G06F 21/552; H04L 63/1408
  See application file for complete search history.

(56) References Cited

U.S. PATENT DOCUMENTS

| | | | |
|---|---|---|---|
| 5,313,616 A | 5/1994 | Cline et al. | |
| 5,440,723 A | 8/1995 | Arnold et al. | |
| 5,623,600 A | 4/1997 | Ji et al. | |
| 5,951,698 A | 9/1999 | Chen et al. | |
| 5,983,348 A | 11/1999 | Ji | |
| 6,092,194 A * | 7/2000 | Touboul | G06F 21/51 726/24 |
| 6,154,844 A | 11/2000 | Touboul et al. | |
| 6,230,312 B1 * | 5/2001 | Hunt | G06F 9/443 707/999.01 |

(Continued)

FOREIGN PATENT DOCUMENTS

WO    WO 98/21683 A2    5/1998

OTHER PUBLICATIONS

Le Charlier,I B. et al., "Dynamic Detection and Classification of Computer Viruses Using General Behaviour Patterns," Proceedings of the Fifth International Virus Bulletin Conference, Virus Bulletin Ltd., Sep. 1995, 22 pages.

(Continued)

*Primary Examiner* — Eleni Shiferaw
*Assistant Examiner* — Nelson Giddins
(74) *Attorney, Agent, or Firm* — Fenwick & West LLP

(57) ABSTRACT

An anti-exploit system monitors and identifies malicious behavior related to one or more protected applications or processes. The anti-exploit system intercepts API calls associated with the protected application or process including parameters passed on to the operating system functions as well as a memory address associated with the caller to the API calls. Based on the characteristics associated with the intercepted API call a Behavioral Analysis Component determines whether the API call is malicious in nature.

17 Claims, 7 Drawing Sheets

(56) References Cited

U.S. PATENT DOCUMENTS

| | | | |
|---|---|---|---|
| 6,357,008 B1 | 3/2002 | Nachenberg | |
| 6,804,780 B1 | 10/2004 | Touboul | |
| 6,983,463 B1* | 1/2006 | Hunt | G06F 9/5066 709/201 |
| 7,263,689 B1* | 8/2007 | Edwards | G06F 9/54 707/999.1 |
| 7,552,477 B1* | 6/2009 | Satish | G06F 9/545 710/260 |
| 7,814,544 B1* | 10/2010 | Wilhelm | G06F 21/566 719/328 |
| 7,917,487 B2* | 3/2011 | Hughes | G06F 9/44505 707/706 |
| 7,975,305 B2* | 7/2011 | Rubin | G06F 21/563 713/153 |
| 8,584,101 B2* | 11/2013 | Moon | G06F 11/3612 717/130 |
| 8,677,494 B2 | 3/2014 | Edery et al. | |
| 2002/0019887 A1* | 2/2002 | Moore | G06F 9/46 719/328 |
| 2004/0158729 A1* | 8/2004 | Szor | G06F 21/52 713/190 |
| 2006/0005244 A1* | 1/2006 | Garbow | H04L 63/1425 726/24 |
| 2008/0016339 A1* | 1/2008 | Shukla | G06F 21/53 713/164 |
| 2009/0007159 A1* | 1/2009 | Rangarajan | G06F 9/544 719/328 |
| 2009/0077664 A1* | 3/2009 | Hsu | G06F 21/566 726/24 |
| 2009/0253408 A1* | 10/2009 | Fitzgerald | G06F 21/316 455/411 |
| 2009/0293118 A1* | 11/2009 | Yan | G06F 21/12 726/19 |
| 2012/0030354 A1* | 2/2012 | Razzaq | G06F 21/335 709/225 |
| 2013/0061323 A1* | 3/2013 | Liske | G06F 21/53 726/23 |
| 2013/0283344 A1* | 10/2013 | Krstic | G06F 21/10 726/1 |
| 2014/0006517 A1* | 1/2014 | Hsiao | G06Q 50/01 709/205 |
| 2014/0075428 A1* | 3/2014 | Van Elsas | G06F 17/5009 717/174 |
| 2015/0234718 A1* | 8/2015 | Dang | G06F 11/1484 711/133 |
| 2015/0319183 A1* | 11/2015 | Liske | H04L 63/1416 726/23 |

OTHER PUBLICATIONS

Martin Jr., D.M. et al., "Blocking Java Applets at the Firewall," Proceedings of the 1997 Symposium on Network and Distributed System Security, IEEE Computer Society Press, Feb. 1997, pp. 16-26.

ThunderBYTE Anti-Virus Utilities User Manual, ThunderBYTE B.V., 1996, 137 pages, [Online] [Retrieved on May 17, 2016] Retrieved from the Internet<URL:http://files.mpoli.fi/unpacked/software/antivir/tbav806.zip/tbay.txt>.

Forrest, S. et al., "A Sense of Self for Unix Processes," Proceedings of the 1996 IEEE Symposium on Security and Privacy, IEEE Computer Society Press, 1996, pp. 120-128.

Habra, N. et al., "ASAX: Software Architecture and Rule-Based Language for Universal Audit Trail Analysis," Computer Security—ESORICS 92, Y. Deswarte et al. (eds.), Springer-Verlag, 1992, pp. 435-450.

Habra, N. et al., "Advanced Security Audit Trail Analysis on uniX (ASAX Also Called SAT-X) Implementation Design of the NADF Evaluator," Sep. 26, 1994, 62 pages.

Anderson, D. et al., "Next-Generation Intrusion Detection Expert System (NIDES) A Summary," SRI International, Computer Science Laboratory, SRI-CSL-95-07, May 1995, 47 pages.

Mounji, A. et al., "Preliminary Report on Distributed ASAX," May 27, 1994, 37 pages.

* cited by examiner

PREVENTING THE SUCCESSFUL EXPLOITATION OF SOFTWARE APPLICATION VULNERABILITY FOR MALICIOUS PURPOSES

CROSS REFERENCE TO RELATED APPLICATIONS

This application claims the benefit of U.S. Provisional Application No. 61/705,374 entitled "System and Method for Preventing the Successful Exploitation of Software Application Vulnerability for Malicious Purposes," to Pedro Bustamante Lopez-Chicheri and David Sanchez Lavado filed on Sep. 25, 2012, which is incorporated by reference herein.

BACKGROUND

This invention relates generally to reducing exposure of computer systems to malicious content.

Software applications may be exploited for malicious purposes. Typically they are used to deploy malware, such as viruses, Trojans, or any other type of spyware. Today's anti-virus programs and other types of protection mostly rely on a pattern or signature of such malware to recognize it and block it. Malware makers have become very good at making the malware change its appearance, hence evading simple pattern recognition. Further, once a pattern is found in a computer, in most cases the damage is already done. Even if further damage can be prevented, often a lot of time is lost in recovering the system and data and bringing it into its pre-attack state, if that is possible. So-called "vulnerabilities" are typically bugs in applications, including browsers that allow such malware to enter a computer system, either through a network connection, through an email or through a manually loaded document or disk, currently in many cases a USB drive. Known vulnerabilities are typically addressed by providing patches to stop exploits from executing and this, among other actions, delivering malware. Although related, an exploit is distinct from malware. An exploit, for example, may be lodged on a legitimate website. The exploit then can affect unsuspecting web visitors and infect them with a malware. Even though manufacturers are sometimes aware of exploits, they can take sometimes weeks or months to release so-called patches or updates to fix those exploits. The general public, as well as targeted governments, firms, and individuals, may be defenseless during those times. If a new pattern is used in the malware, it may remain undetected for days or weeks, potentially creating dramatic losses of data and security information, as well as credentials for accessing other, more secure systems.

SUMMARY

An anti-exploit system monitors and identifies malicious behavior of a protected process of a protected application. The anti-exploit system intercepts an application programming interface (API) call originating from the protected application or protected process. The anti-exploit system captures a memory address associated with the caller of the API call and one or more parameters associated with the API call. A memory analysis is applied to determine if one or more malicious characteristics associated with the API call is present based on the memory address associated with the API call. Furthermore, an element analysis is applied to determine if one or more malicious characteristics associated with the API call is present based on the parameters associated with the API call. Responsive to identifying the malicious characteristics associated with the API call, the protected process is terminated.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system and method disclosed herein prevents the successful exploitation of software application vulnerability for malicious purposes by a behavioral analysis of the actions (operating system or API function calls) and the code execution.

Furthermore, this prevention does not require prior knowledge of a behavioral pattern and can therefore be prevented on a first attempt before a malware payload can even be deployed, thus eliminating repairs that may be costly in time and data.

Figure 1:
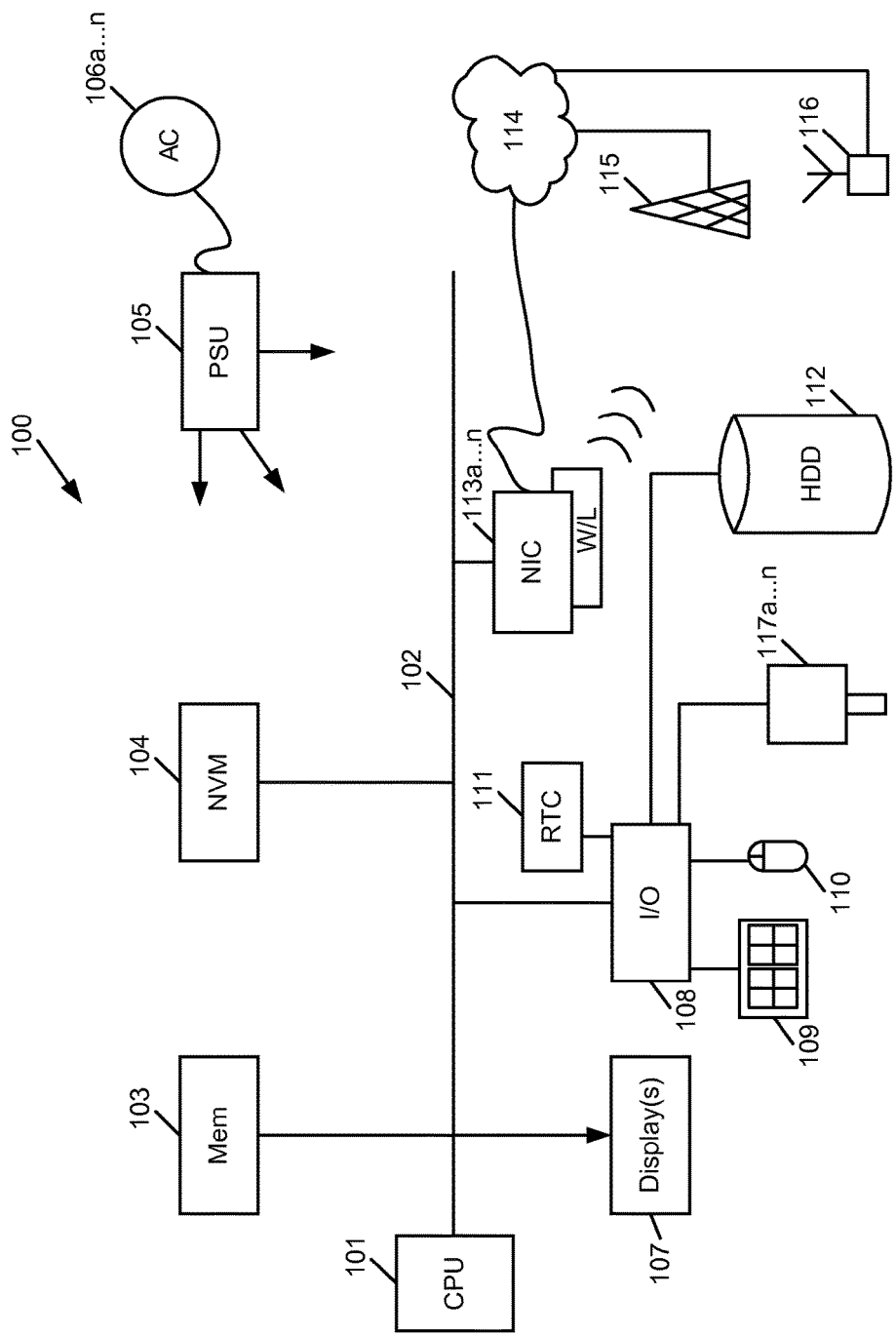
FIG. 1 shows a computer system, according to one aspect of the system and method described herein.

FIG. 1 shows a computer system 100, according to one aspect of the system and method described herein. Computer system 100 is exemplary of any computer that may execute code to process data. Various modifications and changes may be made to the computer system 100 without departing from the scope of the system and method disclosed herein. A CPU 101 is connected to a bus 102, to which the bus 102 is also connected to a memory 103, a nonvolatile memory 104, a display 107, an I/O unit 108, and a network interface card (NIC) 113. The I/O unit 108 may, typically, be connected to an input device 109, such as a keyboard, a touch screen, buttons, etc, mouse or any other suitable graphical input device 110, a hard disk (or in some cases other suitable storage, including, but not limited to solid state disk, RAID, network attached storage, storage area network, portable storage, etc.) 112, one or more cameras 117a-n, and a real-time clock 111. One or more network cards/interfaces 113a-n, some of which may be wireless, may connect to one or more WANs 115 or wireless LANs 116, all of which are connected via Internet 114. Also shown as part of system 100 is a power supply unit 105 connected, in this example, to an ac supply 106. Not shown are batteries that could be present, and many other devices, including but not limited to special enhanced pointing or navigational devices, such as mice, jog wheels, etc, microphone(s) and speaker(s) and/or headset(s) for recording and or playing back audio, and other modifications that are well known but are not applicable to the specific novel functions of the current system and method disclosed herein.

Figure 2:
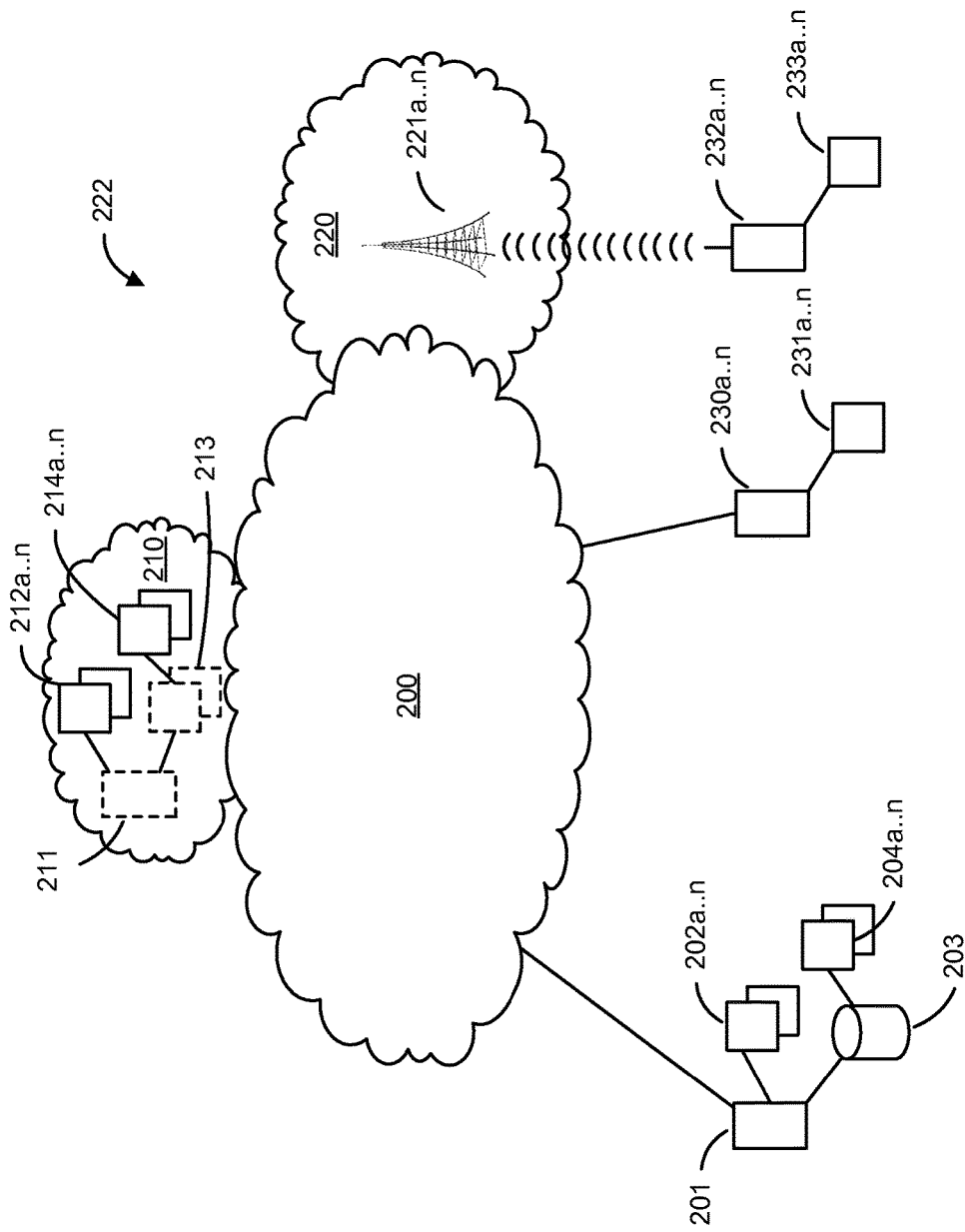
FIG. 2 shows an overview of an exemplary system, according to one aspect of the system and method disclosed herein.

FIG. 2 shows an overview of an exemplary system 222, according to one aspect of the system and method disclosed herein. At the center of the system 222 is an Internet connection 200, shown as a cloud. A server 201 (lower left) has programs 202*a-n* and a storage unit 203, which stores objects 204*a-n*. It is clear that, depending on the configuration of system 222, said system may contain multiple servers and/or multiple storage units, or it may be connected to a network of storage units, or the system may be configured in other ways that provide similar functionality. In other cases, rather than having a physical server at a physical site of a marketing partner, the system may include virtual servers in a so-called "cloud" 210. (Such cloud services are available from various vendors, including, but not limited to, AMAZON, MICROSOFT, DELL, HP, IBM, and others, as well as many smaller vendors.) One or more virtual servers 211 are present in cloud 210. Servers 210 have programs 212*a-n* and also one or more virtual storage units 213, which store objects 214*a-n*. To a user device, such as computer system 100, accessing a server, there are no detectable differences when accessing one or more physical servers located at a physical site, one or more virtual servers in a cloud, or a combination of the two. Many types of server access are available through co-location, shared servers, dedicated servers, and other variations of service. Such variations are not applicable to the specific novel functions of the current system and method disclosed herein. User devices 230*a-n*, which are exemplary of many types of user devices such as computer system 100, may contain software code 231*a-n*. In some cases, additional local storage may be present; the local storage may contain local objects as well. A wireless network 220 with towers 221*a-n* may be representative of any type of wide-area network (WAN), including but not limited to 2G, 2.5G, 2.75G, 3G, 4G, 5G, or any similar type. Independent of the technology, the network 220 enables mobile computing devices (for example, smart phones, tablets, etc.) such as 232*a-n* to connect through the wireless system, through the Internet 200 and to servers such as servers 201 and 211. Devices 232*a-n* may contain software code 233*a-n*, as well as storage units and stored objects, not shown. In this exemplary set-up, the goal would be protection of computers such as 100*x* or 232*x* from malware potentially presented on one or more of said servers. However, in some cases, such servers themselves will also be protected, improving the overall health of the system.

Figure 3A:
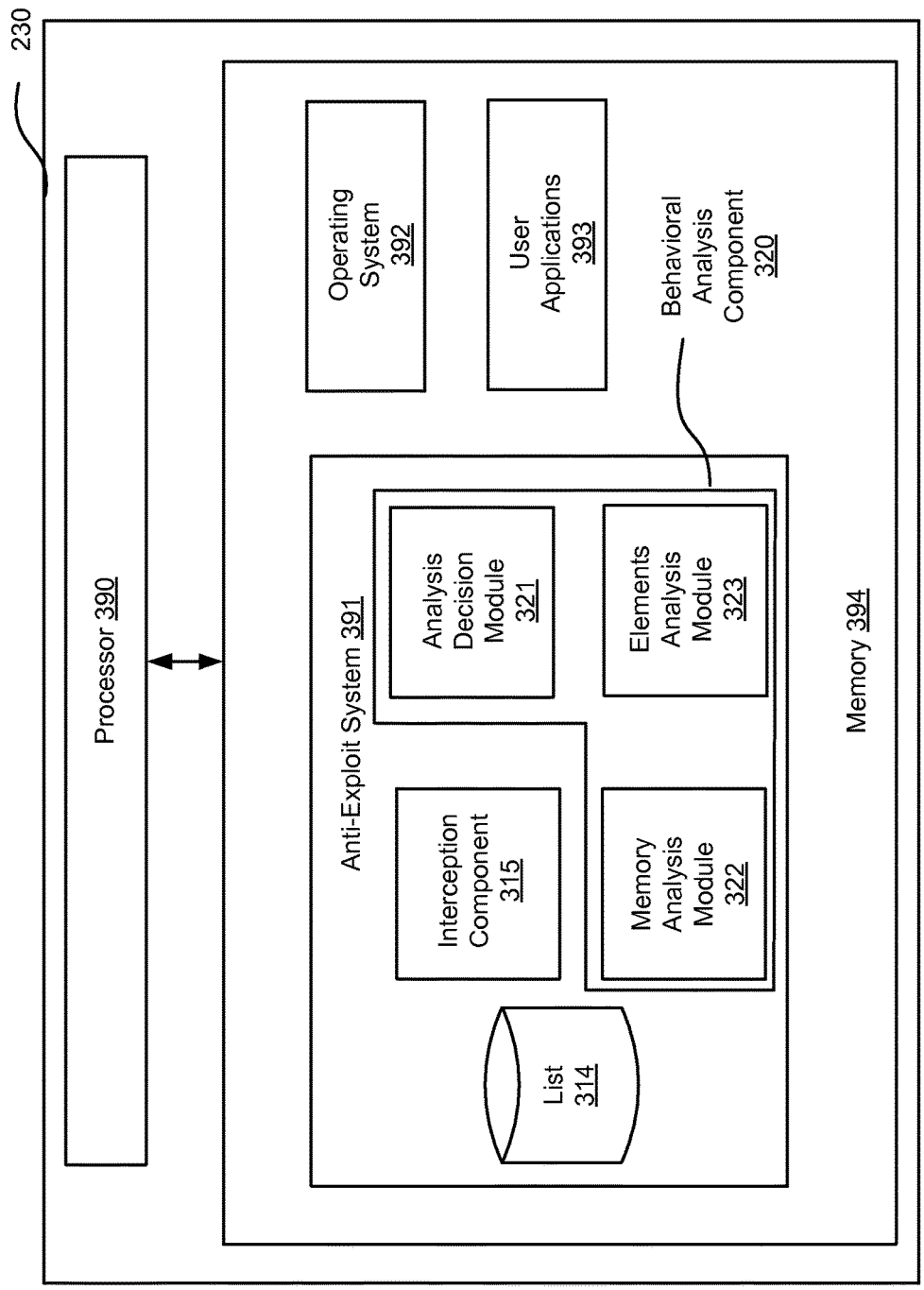
FIG. 3a shows an overview of an exemplary user device, according to one aspect of the system and method disclosed herein.

FIG. 3*a* shows an overview of an exemplary user device 230, according to one aspect of the system and method disclosed herein. In one embodiment the user device includes a processor 390 and a memory or storage medium 394 which includes an operating system 392, user applications 393 and the anti-exploit system 391. The anti-exploit system 391 includes an interception component 315, a list 314, and a behavioral analysis component 320 which includes an analysis decision module 321, a memory analysis module 322 and an elements analysis module 323. In one embodiment the Interception Component 315 captures one or more Element Creation Function (ECF) parameters and one or more Element Use Function (EUF) parameters passed on to the operating system functions, in this example, one or more API calls, as well as the memory address of the caller to said API calls.

ECF APIs calls typically create new elements, such as, for example, a new file or archive, a newly created socket handle, a newly created mutex handle, create or modify the permissions of a memory area, or other, similar element, in the Operating System. This element creation is performed with information existing on the user device 230 or with information downloaded from a remote location such as the Internet. Examples of ECF type API calls are CreateFileW, and URLDownloadToFileW.

EUF APIs calls operate on elements that have been created on the Operating System by an ECF type API. Such elements may include, for example, execution of a file, thus converting this action into a new process; sending data via a network or a socket; receiving data via a network or a socket, etc. Under some circumstances an ECF type API can behave as an EUF. Examples of EUF type API calls are CreateProcessA and WinExec.

The captured information is sent to the Behavioral Analysis Component 320.

The Behavioral Analysis Component 320 processes the information using an Analysis Decision Module 321, a Memory Analysis Module 322 and/or an Elements Analysis Module 323. The Analysis Decision Module 321 is optionally included to determine whether or not to allow the application to proceed with the intercepted API call or whether to pass information about the API call to the behavioral analysis component 320 for further analysis. In one embodiment, the Analysis Decision Module 321 makes this determination by comparing the intercepted API call to a list of disallowed API calls associated with the application. Optionally, the Analysis Decision Module 321 is omitted and every intercepted API call is passed to the Behavioral Analysis Component 320. The Memory Analysis Module 322 checks the location of the caller making the API call in memory. Based on the location of the caller in memory the Memory Analysis Module 322 determines whether the caller is malicious. If the Memory Analysis Module 322 does not determine that the caller is malicious based on the memory location, the information is passed to the Elements Analysis Module 323. The Elements Analysis Module 323 checks the ECF and EUF API parameters and determines based on the parameters of the API call whether the API call is malicious in nature.

The determinations made by the various components of the anti-exploit system 391 may be based on policies or other information stored in List 314. List 314 is typically stored in a secure data repository controlled by the system described herein, for example, a segregated section on a non-volatile storage 112, or any other suitable local or remote storage, alone or in combination. Also, in some cases, rather than just a list 314, some type of data structure like a database may be used in lieu of a list.

If the anti-exploit system 391 identifies that an API call is malicious in nature, the system terminates the process belonging to the protected software application to protect it from what has now been determined as a malicious vulnerability exploit. An aspect of the system and method disclosed herein is the observation and analysis, as described here throughout, of the behavior of individual programs' processes 393 and operating system (OS) 392 components, and interception of non-compliant behavior, regardless of the data or patterns involved.

Figure 3B:
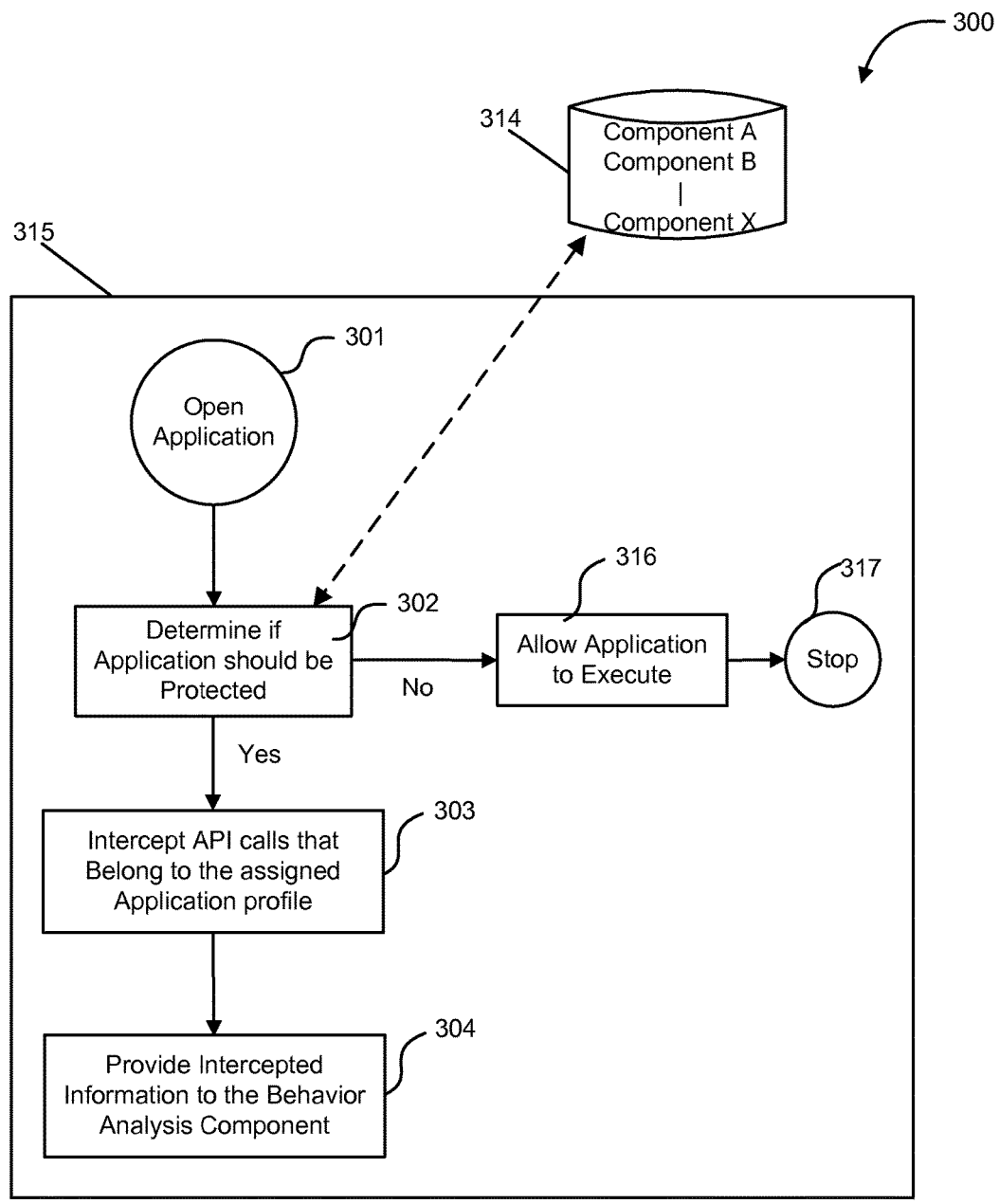
FIG. 3b shows an overview of an exemplary process for determining whether an application is protected, as described above, according to one aspect of the system and method disclosed herein.

FIG. 3b shows an overview of an exemplary process for determining whether an application is protected, as described above, according to one aspect of the system and method disclosed herein. In step 301, the user opens an application or begins executing a component of an application (e.g., opening a MICROSOFT WORD document). In step 302, the Interception Component 315, detects whether or not this application should be protected, typically by looking up a list 314 of programs and associated processes to be protected. If the program appears in the list 314, the process continues to step 303; if not, the Interception Components 315 determines that the program is not on the list of protected applications, and the process moves to step 316, where the program is allowed to execute without being protected, and the process then stops at step 317.

If, in step 302, the Interception Component 315 determines that the application should be protected, the Interception Component 315 intercepts one or more API calls made by the application in step 303. The intercepted information may include, for example, the memory address of the location of code that has called the intercepted API and the parameters of the API call itself. The system captures this information so the Behavioral Analysis Component 320 can process it. In one embodiment, the Interception Component 315 intercepts calls from two distinct families or types of APIs described above: (1) the family of Element Creation Functions (ECF type APIs); and (2) the family of Element Use Functions (EUF type APIs).

In one embodiment, the choice of which calls to intercept depends on a "profile" associated with the application. The interception component may intercept all calls associated with the application profile or a subset of calls known to display exploiting characteristics. For example, in one embodiment, a different list of calls is associated with each profile, and the Interception Component 315 detects whenever a call occurs that is on the list associated with the profile of the application making the call. Different profiles may be associated with different applications or groups of applications that are designed for a similar use. Examples profile groups include: a web browsing profile for use with applications designed for browsing the World Wide Web using mostly HTTP and HTTPS protocols; an office application profile for use with applications designed for processing texts, spreadsheets, presentations and other types of documents; and a multimedia application profile for use with applications designed for the reproduction of audio and video files.

Figure 3C:
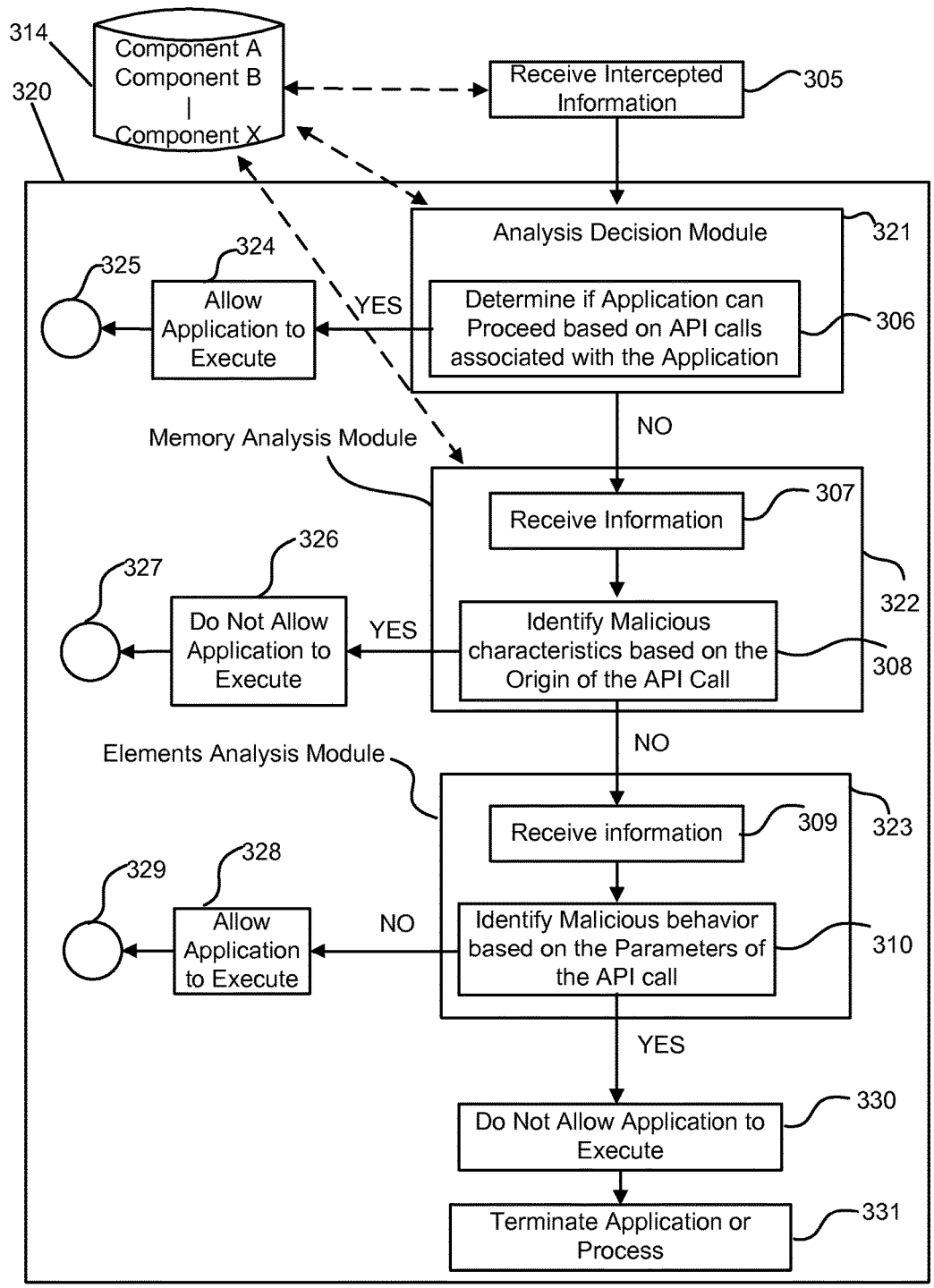
FIG. 3c shows an exemplary process for analyzing the behavior of protected application processes according to one aspect of the system and method disclosed herein.

In step 304, the Interception Component that intercepts API calls provides the intercepted information to the Behavior Analysis Component 320, as described in the discussion of FIG. 3c, following.

FIG. 3c shows an exemplary process 350, which describes the use of Behavioral Analysis Component 320 to analyze the behavior for programs according to one aspect of the system and method disclosed herein. In one embodiment, the process of FIG. 3c executes after an API is intercepted, as described above with respect to FIG. 3b.

In one embodiment, the Behavioral Analysis Component 320 receives the intercepted information in step 305. In the following steps, the Behavioral Analysis Component 320 evaluates the evidence captured in the ECF and EUF APIs to determine whether to block or allow the actions that a software application protected by the system wants to perform. Further, the Behavioral Analysis Component 320 may monitor the behavior of one or more applications based on the API calls made by the application. This allows the system 391 to dynamically analyze the exploitability of an application and the nature of and instances in which API calls are made by an application. In one embodiment, the Behavioral Analysis Component 320 comprises three modules: an Analysis Decision Module 321, a Memory Analysis Module 322, and an Element Analysis Module 323. The described examples discuss how each of the modules 321, 322, and 323 are used in combination to analyze potential vulnerabilities. In alternative embodiments, one or more of these modules 321, 322, 323 may be used independently of each other and one or more of the modules may be omitted.

In step 306, the Analysis Decision Module 321 determines whether or not to allow the application to proceed with the intercepted API call. In one embodiment, the Analysis Decision Module 321 does not allow any intercepted calls to proceed without further analysis, and all intercepted calls are passed to the Memory Analysis Module 322. Alternatively, the Analysis Decision Module 321 may allow some API calls to execute without further analysis by the Memory Analysis Module 322 or the Elements Analysis Module 323. In one embodiment, this decision is made based on parameters passed to ECF-type API calls. In this embodiment, EUF-type calls are also generally passed directly on to the Memory Analysis Module 322. In another embodiment, this determination can be made by checking whether the API call is associated with one or more black listed API calls associated with the profile for the protected application. If, in step 306, the Analysis Decision Module 321 determines that the API call is legitimate and can proceed without behavioral analysis, it permits the application to proceed with the API call in step 324 without further analysis. If, however, in step 306, the Analysis Decision Module 321 determines that the API call warrants further analysis, the Analysis Decision Module 321 passes information, such as, for example, the memory address of the caller of the API call, to the Memory Analysis Module 322, which receives this information in step 307.

In step 308, the Memory Analysis Module 322 examines the memory address of the API caller to identify malicious behavior. In one embodiment the Memory Analysis Module 322, in step 308, detects the origin of the call, for example, a module of the application (e.g., a dynamic link library file) that made the API call. If the Memory Analysis Module 322 determines that the module making the call has malicious characteristics, the Behavioral Analysis Module 320 blocks this action in step 326 and the process stops at step 327.

In one embodiment, the Memory Analysis Module 322 determines whether the memory address from where the call originates has malicious characteristics based on a variety of factors. For example, in one embodiment, a malicious characteristic is detected when the memory address of a call to an ECF or EUF API is located in a memory area without execute access. For example, with respect to the normal behavior of processes performed by protected applications, the Memory Analysis Module 322 expects that API calls made by callers belonging to the protected application, be made from area in memory that have been granted execute privileges. Otherwise, the behavior may be identified as being malicious. In another embodiment, a malicious characteristic is detected when the memory address belongs to a module, such as, for example, Dynamic Link Library (DLL), which has been loaded by the protected software application and the action of the DLL is to call an ECF or EUF type API for which it has not been designed to call, or when the parameters in the call to an ECF or EUF API indicate that the action which is being performed is not what the DLL was designed for. For example, if an ADOBE FLASH DLL loaded in the process space of the Internet Explorer application calls the CreateFile API in order to read a file from disk, this is considered normal behavior. However, if the ADOBE FLASH DLL calls the CreateFile API to create a portable executable (PE) file on the disk, the behavior of the process may be deemed malicious because the behavior is atypical.

In another embodiment, a malicious characteristic is detected when the memory address of the caller to the ECF or EUF API is located within a range of memory of the protected software process known to be associated with malicious activity. For example, when a protected application is initiated, modules of the protected application may occupy different ranges of memory. If an API call associated with the protected application is made by a caller outside of the ranges of memory occupied by the modules of the protected application, the caller of the API call, or the behavior of the caller may be deemed malicious. Further, the anti-exploit system 391, may analyze a predefined range of memory addresses that are known to be related to malicious behavior. In another example, the anti-exploit system 391 may analyze a predefined range of memory addresses around the memory location of the caller of the API to determine whether the caller is expressing malicious behavior. In other alternative embodiments, malicious characteristics may be detected based on a combination of one or more of the above factors.

If module 322 does not detect any malicious characteristic associated with the API call based on memory analysis, the Element Analysis Module 323 receives 309 information relating to the call (for example, the parameters of the call). The Element Analysis Module 323, in step 310, identifies malicious behavior based on parameters of the API call. For example, in one embodiment, the Element Analysis Module 323 verifies the actions to be performed to elements that are being created or have already been created, based on the parameters associated with the API call. For example, in one embodiment, an action is determined to be malicious 310 when the parameters passed in the call to an ECF API contain values which the system deems as malicious (e.g., Microsoft PowerPoint calling the CreateFile API to create a PE file on disk). In another embodiment, an action is determined to be malicious when the parameters passed in the call to a EUF API contain values which the system deems as malicious (e.g., Microsoft PowerPoint calling the CreateProcess API to create a new process using commands such as cmd.exe to perform a malicious action). In another embodiment, an action is determined to be malicious when the an element created with an ECF API is used in the call to a EUF API as will be described in further detail below with respect to FIGS. 3d and 3e. In this case, the calls to a EUF API do not need to belong necessarily to the same protected process to be considered malicious. In other alternative embodiments, an action may be determined to be malicious based on a combination of one or more of the above factors.

If no malicious behavior is identified in step 310, then the application is allowed to execute the API call in step 328 and the interception process for that specific API call only ends in step 329. Otherwise, in step 330, the system does not allow the application to execute the API call after determining that the API call made by a process or application is malicious in nature. In step 331, the system terminates the execution of the protected application process having determined that the API call made by the process is malicious in nature.

Figure 3D:
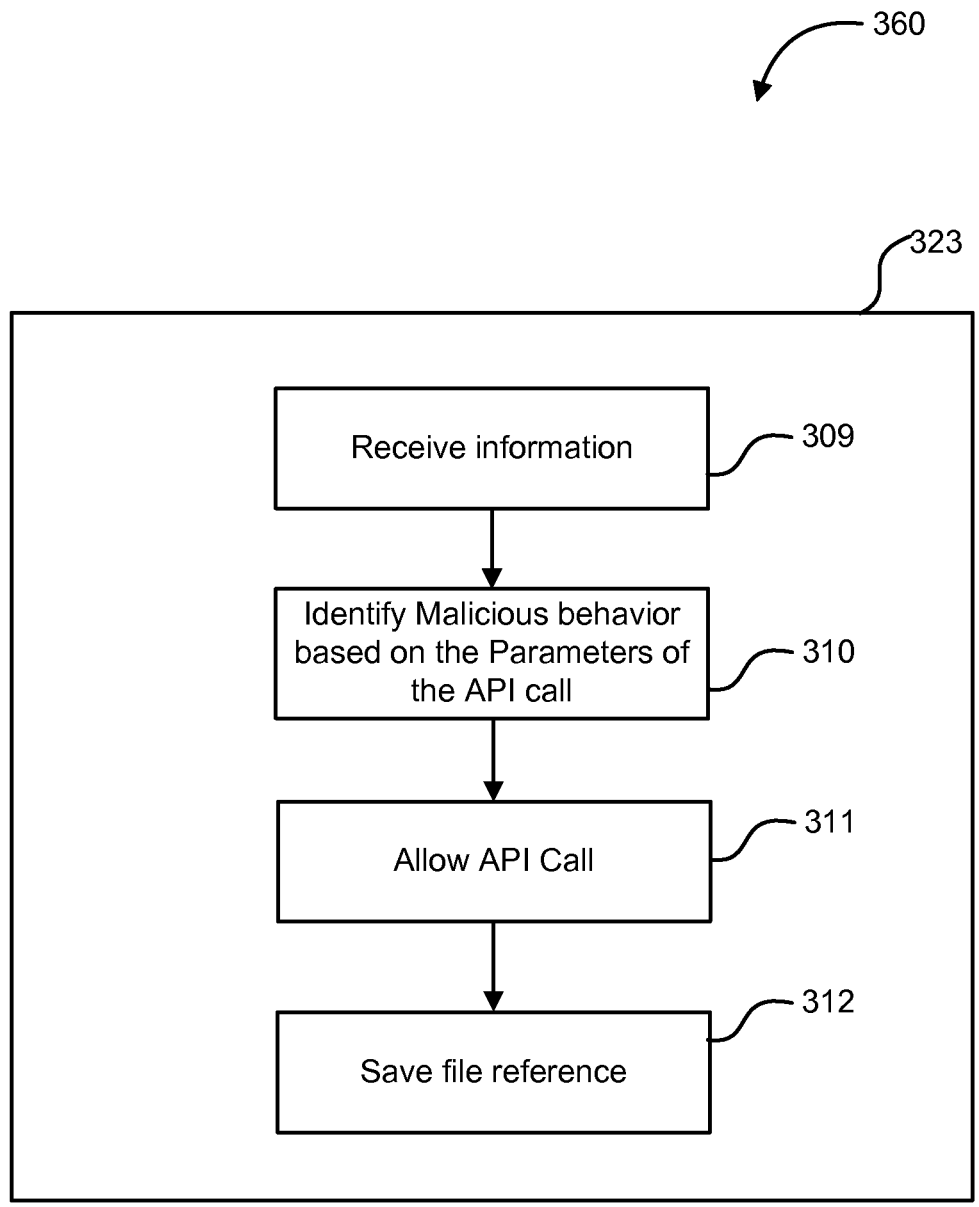
FIG. 3d shows a process, which is an exemplary detail of the Element Analysis Module within the Behavioral Analysis Component, according to the system and method disclosed herein.

FIG. 3d shows a process 360, which may be performed by the Element Analysis Module 323 within the Behavioral Analysis Component 320, according to the system and method disclosed herein. The Element Analysis Module 323 receives information in step 309 and detects that a new file is about to be created on the system, based on the parameters associated with the API call. The Element Analysis Module 323, in step 310, identifies malicious behavior based on parameters of the API call. In one embodiment, in step 311, the Behavioral Analysis Component 320 may allow the call (e.g., a URLDownloadToFileW call) and in step 312 saves a reference of the newly created file for future comparison and/or anlaysis. In one example, if the call to the API is denied, the system terminates the execution of the process, captures the information of the created file to a secure location for future analysis and/or comparison and deletes the file from its original location.

Figure 3E:
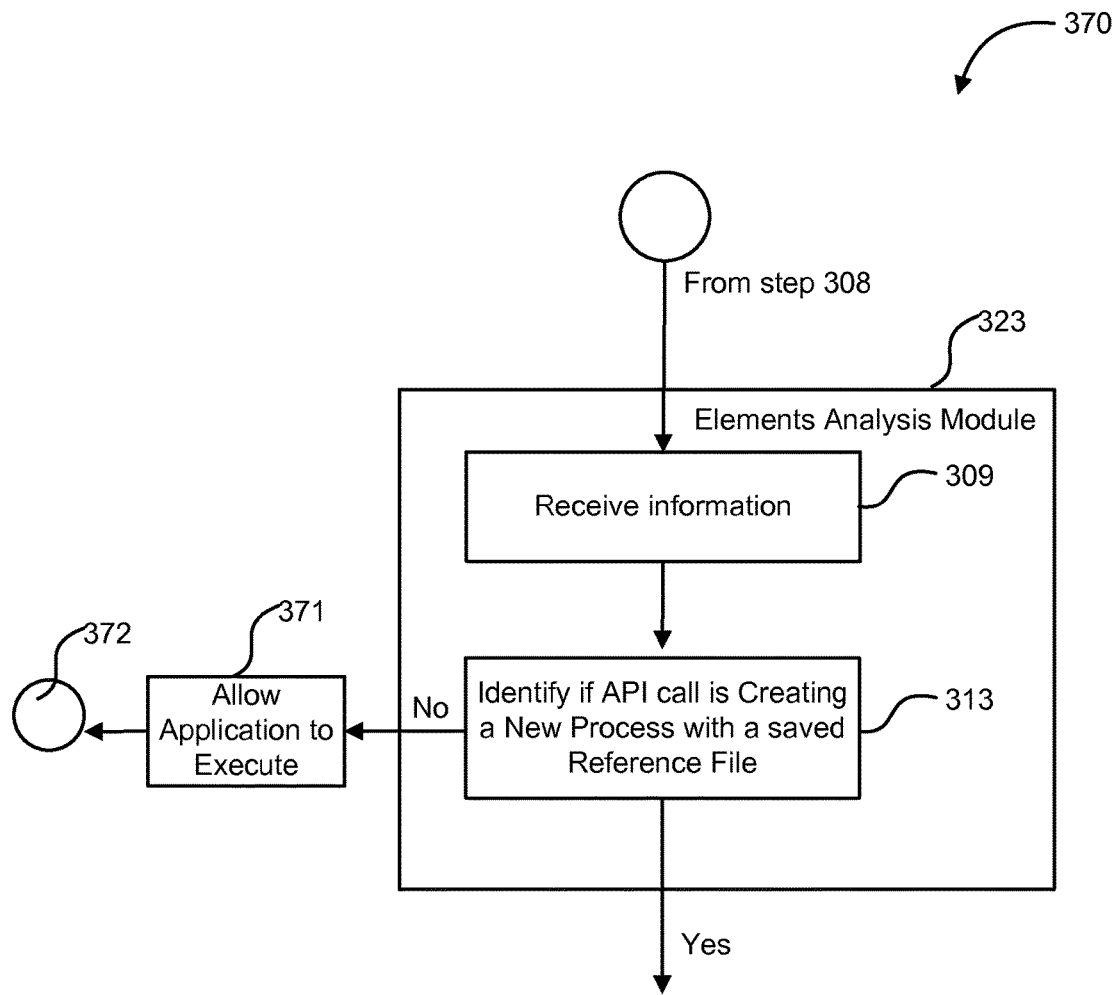
FIG. 3e shows a process, which is another exemplary detail of the Element Analysis Module within the Behavioral Analysis Component, according to the system and method disclosed herein.

FIG. 3e shows yet another exemplary process, which may be performed by the Element Analysis Module within the Behavioral Analysis Component, according to the system and method disclosed herein. In one embodiment, the Elements Analysis Module 323 receives information in step 309 as described previously, and detects, in step 313, that an API call is being made to create a new process with the file that the system has a previous reference of, such as file created with respect to the exemplary process described with respect to FIG. 3c. In one embodiment, the anti-exploit system 391 prevents the API call to the saved reference file from executing after identifying that the API call intends to start a new process with the reference file. In another embodiment, the Elements Analysis Module 323 identifies that an API call is being made to the saved reference file from an application not associated with the reference file or from an application that did not create the saved reference file. The Elements Analysis Module 323 blocks this action in step 371 and the process stops at step 372.

An example of the process of FIGS. 3b and 3c is now described with respect to a word processing application such as MICROSOFT WORD. Referring first to FIG. 3b, in step 301, the user opens a Microsoft Word document. In step 302, the system, within its Interception Component 315, detects that this application needs to be protected, by looking up a list 314 of programs and associated process to be protected. In step 303, the system starts intercepting the API calls made by the Microsoft Word application to certain ECF and EUF APIs that belong to the Office Application Profile. In step 303 the Interception Component 315 detects an API call, such as a call to the Kernel32.dll is made to read a file from the system. For example, the Interception Component 315 may intercept an API a call to the Kernel32.dll CreateFileW API (for example, in the case of a Windows™ operating system, or equivalent in some other OS). Before the API call is allowed to execute, the Interception Component 315 captures intercepted information 303 such as the parameters and memory address of the location of code that has called the intercepted API. In step 304, the Interception Component intercepting API provides the intercepted information to the Behavior Analysis Component 320, as described in the discussion of FIG. 3c, following.

In step 306, the Analysis Decision Module 321 determines that further analysis is warranted and passes the information, such as, for example, the memory address of the caller of the CreateFileW API call, to the Memory Analysis Module 322, which receives this information in step 307.

In this example scenario, the Memory Analysis Module 322 does not identify any malicious characteristics associated with the location of the caller of the CreateFileW API call. The Element Analysis Module 323 then receives the information regarding the API call in step 309 and, in step 310, examines the information. Based on the parameters associated with the API call the Elements Analysis Module 323 identifies that the caller is trying to create a potentially executable type file on the system, and hence does not allow the API call to execute. The Element Analysis Module 323 in step 330 does not allow the call to the function. In step 331, the system terminates the execution of the protected application process having determined that the API call made by the process is malicious in nature.

Another example is now described with respect to a browser application. In this example, the user opens the Internet Explorer browser application. The system, through its Interception Component 315, detects in step 302 that this application is on the list of applications to be protected, and in step 303 starts intercepting the calls it makes to certain ECF and EUF APIs that belong to the Web Browsing Profile. In one instance the Interception Component 315 identifies that a call to the Kernel32.dll CreateProcessW API is made to execute a new process on the system. This information is sent to the Analysis Decision Module 321 within the Behavioral Analysis Component 320. The Analysis Decision Module passes the information (in this case the memory address of the caller of the CreateProcess API) to the Memory Analysis Module 322.

In one embodiment the Memory Analysis Module 322, in step 308, detects that the memory address of the caller to the CreateProcessW API belongs to a java module located in memory. The anti-exploit system 391 identifies that this module has not been designed to perform this action. For example, a java applet loaded by the Internet Explorer application and interpreted by java generally does not have access to system files, and thus is not designed to execute the CreateProcessW API. The Internet Explorer application is promptly terminated and the malicious caller identified.

In another example, the user opens the Internet Explorer browser application (in the case of a Microsoft Windows system, for example, as is the case for the rest of this example section) the system, through the Interception Component 315 identifies that a call to the URLDownloadToFileW API (ECF type API) from urlmon.dll is made to save a remote file on the local system. This information is sent to Analysis Decision Module 321 within the Behavioral Analysis Component 320, which in turn passes the information (in this case the memory address of the caller of the URLDownloadToFileW API) to Memory Analysis Module 322. In step 308, the Memory Analysis Module does not detect any malicious characteristic. The Analysis Decision Module then passes this the information (in this case the parameters that have been used in the URLDownloadToFileW call) to Element Analysis Module 323.

In one embodiment, referring now to the process described with respect to FIG. 3d, in step 311, the Behavioral Analysis Component 320 may allow the URLDownloadToFileW and in step 312 the Behavioral Analysis Component 320 saves a reference of the newly created file for future comparison and/or anlaysis.

Now referring to the process described with respect to FIGS. 3b, 3c and 3e the Interception Component 315 at a later time identifies a call to the WinExec API (EUF type API) of the Kernel32.dll library. Again, this information is passed on to Analysis Decision Module 321, which passes it directly (in this example, the information passed on is the memory address of the source that has called the WinExec API) to Memory Analysis Module 322, since it is a EUF API. The Memory Analysis Module 322 does not detect any malicious characteristics and, in this example, passes the information to the Decision Analysis Module 322 to pass the information (in this case the parameters that have been passed to the WinExec function) in step 309 to Element Analysis Module 323. The Elements Analysis Module detects, in step 313, that Internet Explorer is trying to create a new process with the file that the system has a previous reference of (the file created with the URLDownloadToFileW call as described above). The Behavioral Analysis Component 320 considers the action malicious and does not allow the call to the WinExec function and the system terminates the execution of the Internet Explorer process.

It is clear that many modifications and variations of the system and method disclosed herein may be made by one skilled in the art without departing from the scope of the disclosure.

In some cases, the system and method disclosed herein may comprise a system consisting of a computing device, including a processor for executing programs, working memory (RAM), and at least some non-volatile memory, containing at least some instructions and programs, said programs including at least an operating system as well as some applications, and a machine readable program; said computing device coupled to at least one other computing device, wherein a software module verifies, using behavioral analysis, the actions to be performed to elements of a program or operating system component which are being created or have already been created. These actions may be considered malicious if, for example, the parameters passed in the call to an ECF API contain values which the system deems as malicious, or, as yet another example, if the parameters passed in the call to an EUF API contain values which the system deems as malicious, or, as a third example, if the system verifies that an element being created with an ECF API is used in the call to a EUF API, where the call to a EUF API does not need to belong necessarily to the same protected process. Further, the memory address of the caller used for said call may belong to a module that has been loaded by the protected software application, and said module may call an ECF or EUF type API for which it has not been designed, or, in another case, the memory address of the caller used for said call may belong to a module that has been loaded by the protected software application, and said module may pass parameters in the call to an ECF or EUF API, said parameters indicating that the action that is being performed is not what the DLL was designed for.

These modifications and variations do not depart from its broader spirit and scope, and the examples cited here are to be regarded in an illustrative rather than a restrictive sense.

What is claimed is:

1. A method for identifying malicious behavior of a protected process of a protected application, the method comprising:

storing a plurality of application profiles, each of the plurality of application profiles associated with a different group of related applications of a particular application type, each of the plurality of application profiles including a different list of application programming interface (API) calls;

detecting an API call originating from the protected process;

determining an application profile applicable to the protected application based on an application type of the protected application;

comparing the API call against a list of API calls included in the application profile corresponding to the protected application;

determining to intercept the API call based on its presence in the list of API calls included in the application profile; and responsive to determining to intercept the API call:
capturing a memory address associated with the API call and one or more parameters associated with the API call;
applying, by a computing system, a memory analysis to determine if the memory address associated with the API call lacks execute access;
applying, by the computing system, an element analysis to determine if a malicious characteristic associated with the API call is present based on the one or more parameters associated with the API call; and
responsive to detecting that the memory address associated with the API call lacks execute access or determining that the malicious characteristic associated with the API call is present, terminating the protected process.

2. The method of claim 1, wherein applying the memory analysis further comprises:
determining if the memory address associated with the API call belongs to a module not designed to make the API call.

3. The method of claim 1, wherein applying the memory analysis further comprises:
determining if the memory address associated with a caller of the API call is within a specific range of memory.

4. The method of claim 1, wherein applying the element analysis further comprises:
determining if the parameters of the API call include a characteristic known to enable the malicious behavior of the protected application.

5. The method of claim 1, wherein applying the element analysis comprises:
storing a reference to a new file created with a prior API call upon its creation; and
identifying when the API call attempts to create a new process with the new file created with the prior API call.

6. The method of claim 1, further comprising:
associating the protected application with an application profile; and
determining to intercept the application programming interface (API) call based on its presence in a list of API calls associated with the application profile.

7. The method of claim 1, further comprising:
determining that the protected process should be protected based on its presence in a list of applications and associated processes to be protected.

8. A non-transitory computer-readable storage medium configured to store executable computer code that when executed by a processor causes the processor to perform steps including:
storing a plurality of application profiles, each of the plurality of application profiles associated with a different group of related applications of a particular application type, each of the plurality of application profiles including a different list of application programming interface (API) calls;
detecting an API call originating from the protected process;
determining an application profile applicable to the protected application based on an application type of the protected application;
comparing the API call against a list of API calls included in the application profile corresponding to the protected application;
determining to intercept the API call based on its presence in the list of API calls included in the application profile; and
responsive to determining to intercept the API call:
capturing a memory address associated with the API call and one or more parameters associated with the API call;
applying, by a computing system, a memory analysis to determine if the memory address associated with the API call lacks execute access;
applying, by the computing system, an element analysis to determine if a malicious characteristic associated with the API call is present based on the one or more parameters associated with the API call; and
responsive to detecting that the memory address associated with the API call lacks execute access or determining that the malicious characteristic associated with the API call is present, terminating the protected process.

9. The non-transitory computer-readable storage medium of claim 8, wherein applying the memory analysis further comprises:
determining if the memory address associated with the API call belongs to a module not designed to make the API call.

10. The non-transitory computer-readable storage medium of claim 8, wherein applying the memory analysis further comprises:
determining if the memory address associated with a caller of the API call is within a specific range of memory.

11. The non-transitory computer-readable storage medium of claim 8, wherein applying the element analysis comprises:
determining if the parameters of the API call include a characteristic known to enable the malicious behavior of the protected application.

12. The non-transitory computer-readable storage medium of claim 8, wherein applying the element analysis comprises:
storing a reference to a new file created with a prior API call upon its creation; and
identifying when the API call attempts to create a new process with the new file created with the prior API call.

13. The non-transitory computer-readable storage medium of claim 8, further comprising:
associating the protected application with an application profile; and
determining to intercept the application programming interface (API) call based on its presence in a list of API calls associated with the application profile.

14. The non-transitory computer-readable storage medium of claim 8, further comprising:
determining that the protected process should be protected based on its presence in a list of applications and associated processes to be protected.

15. A system, comprising:
a processor;
a non-transitory computer-readable storage medium comprising instructions configured to be executed by the processor to perform a process comprising:
storing a plurality of application profiles, each of the plurality of application profiles associated with a different group of related applications of a particular application type, each of the plurality of application profiles including a different list of application programming interface (API) calls;

detecting an API call originating from the protected process;

determining an application profile applicable to the protected application based on an application type of the protected application;

comparing the API call against a list of API calls included in the application profile corresponding to the protected application;

determining to intercept the API call based on its presence in the list of API calls included in the application profile; and responsive to determining to intercept the API call:
    capturing a memory address associated with the API call and one or more parameters associated with the API call;
    applying, by a computing system, a memory analysis to determine if the memory address associated with the API call lacks execute access;
    applying, by the computing system, an element analysis to determine if a malicious characteristic associated with the API call is present based on the one or more parameters associated with the API call; and
    responsive to detecting that the memory address associated with the API call lacks execute access or determining that the malicious characteristic associated with the API call is present, terminating the protected process.

16. The system of claim 15, wherein applying the element analysis comprises:
    storing a reference to a new file created with a prior API call upon its creation; and
    identifying when the API call attempts to create a new process with the new file created with the prior API call.

17. The system of claim 15, wherein applying the element analysis comprises:
    determining if the parameters of the API call include a characteristic known to enable the malicious behavior of the protected application.

* * * * *